United States Patent Office 3,334,021
Patented Aug. 1, 1967

3,334,021
PROCESS FOR PREPARING DIPICOLINIC ACID
Phillip H. Hodson and Walter A. Darlington, St. Louis County, Mo., assignors to Monsanto Company, St. Louis, Mo., a corporation of Delaware
No Drawing. Filed Apr. 9, 1964, Ser. No. 358,658
16 Claims. (Cl. 195—28)

This invention relates to a process for preparing dipicolinic acid. In one major aspect, this invention relates to a fermentation process for producing dipicolinic acid from hydrocarbons by the action of a Penicillium mold upon the hydrocarbon in a mineral salts medium.

Dipicolinic acid, which was first isolated from a biological source of a Japanese food composed of steamed soybeans inoculated with *Bacillus natto,* has also been reported to be released from germinating spores of *Bacillus megaterium* and *Bacillus subtilis.* It has also been discovered that dipicolinic acid can be produced from the fermentation of glucose in the presence of a Penicillium mold and from the fermentation of a combination of glycerol and L-norvaline in the presence of a Penicillium mold.

It has now been discovered that dipicolinic acid can be produced from the fermentation of hydrocarbons in the presence of a Penicillium mold. The utilization of hydrocarbons in the production of dipicolinic acid, in addition to providing a new class of compounds as a source of dipicolinic acid, also provides the user with a definite cost advantage over the use of glucose, glycerol and L-norvaline, and other materials as sources of carbon in the production of dipicolinic acid.

It is a primary object of this invention to provide an improved process for the production of dipicolinic acid. Additional objects, benefits and advantages will become apparent as the detailed description of the invention proceeds.

The present invention is based upon the discovery that dipicolinic acid, pyridine-2,6-dicarboxylic acid, can be produced by the action of a Penicillium mold upon a hydrocarbon under aerobic fermentation conditions in the presence of an aqueous mineral salts medium containing a nitrogen source.

The Penicillium mold used in this process has been registered with the U.S. Department of Agriculture and bears the identification number NRRL 3114. This organism is the same mold used by Ooyama et al. in the production of dipicolinic acid from glucose. Ooyama, Nakamura, and Tanabe, Biosynthesis of Dipicolinic Acid by Molds, Report of the Fermentation Research Institute of Japan, 19, 75–81 (1961). The mold can be either incubated or cultured (either grown or maintained) in the mineral salts-hydrocarbon medium. In our work, we have found it desirable to provide a mineral salts-hydrocarbon medium suitable for causing growth of the mold in the presence of the hydrocarbon, but an alternate procedure in which a quantity of the mold is added to a mineral salts-hydrocarbon mixture and merely maintained without further appreciable growth is also included within the scope of this invention.

The hydrocarbons in the fermentation mixture provide the Penicillium mold with a source of carbon and hydrogen for the production of dipicolinic acid. The concentration of hydrocarbon in the mineral salts medium is limited only insofar as it is necessary not to have present an amount of hydrocarbon toxic to the mold. The limitation on concentration of hydrocarbons imposed by their toxicity restricts the use of several hydrocarbons as substrates for dipicolinic acid production. As an example, the aromatic hydrocarbons such as benzene, toluene, and xylene can be used as sources of carbon and hydrogen in the production of dipicolinic acid, but their concentrations must be kept at a low level because of their toxic effect upon the Penicillium mold. Generally, paraffinic and olefinic hydrocarbons exhibit a significantly less toxic effect and hence are preferred for producing dipicolinic acid according to this invention. Particularly preferred are the straight-chain paraffins and olefins having from about 10 to about 20 carbon atoms. Hydrocarbons of this type have been observed to have little or no toxic effect upon the Penicillium mold. Examples include n-octadecane, n-hexadecane, n-tetradecane, n-tetradecene-1, n-dodecane, n-dodecene, and n-decane. Other suitable hydrocarbons include n-octane, 2-methylheptane, cyclohexane, n-hexane, n-pentane, 3-methyl hexane, n-hexyne-1, n-octadecyne-1, 2-methylpentene-2, 3-methylheptene-1, benzene, toluene, and xylene. Also useful are petroleum fractions containing mixtures of several of the above compounds, especially those fractions having a high proportion of the particularly preferred hydrocarbons. An example of such a petroleum fraction is a kerosene having a boiling range of about 140° to about 300° C. Other examples include gas oils, fuel oils, and crude petroleum.

Concentrations of hydrocarbon in the mineral salts medium can range from less than 0.05% for the relatively toxic aromatics to more than 10% for the non-toxic straight-chained paraffins and olefins of 10 to 20 carbon atoms. A satisfactory technique for adding volatile hydrocarbons to the mineral salts medium has been to incorporate a specified amount of the volatile hydrocarbon into a molten agar substrate. After the agar has cooled and solidified, a volume of agar containing the desired quantity of hydrocarbon can be cut out and added to the salts medium. The retarded release of the hydrocarbon from the agar substrate prevents excessive evaporation and helps to prevent the presence of a toxic level of the hydrocarbon in the culture medium.

The mineral salts medium is an aqueous solution of several metal salts designed to promote the growth of the Penicillium mold, and thereby aid in the production of dipicolinic acid. A medium which has been found suitable consists of:

| | |
|---|---|
| $KH_2PO_4$ | g__ 5 |
| $MgSO_4 \cdot 7H_2O$ | g__ 1 |
| $NaNO_3$ | g__ 20 |
| Liquid corn steep liquor | ml__ 1 |

This mixture of salts is diluted with distilled water to a total volume of one liter. Variation from the above formulation is possible in the normal routine of experimentation. For instance, the corn steep liquor, a source of nutrient minerals present in trace quantities, can be replaced by a synthetic mixture of minerals comparable to those found in the liquor. A formulation of minerals which has been found to be a satisfactory replacement for corn steep liquor is as follows:

| | |
|---|---|
| $FeSO_4 \cdot 7H_2O$ | mg__ 1 |
| $CaCl_2$ | mg__ 15 |
| B (as $H_3BO_3$) | µg__ 10 |
| Mn (as $MnSO_4 \cdot 5H_2O$) | µg__ 10 |
| Zn (as $ZnSO_4 \cdot 7H_2O$) | µg__ 70 |
| Mo (as $MoO_3$) | µg__ 10 |

The salts are dissolved in one milliliter of water and can be used as a replacement for the corn steep liquor. Another variation in the mineral salts medium comprises the use of urea or an ammonium salt as the nitrogen source for dipicolinic acid instead of the nitrate salt described above. Other variations in the kind and amount of minerals in the mineral salts medium and the trace elements solution are also within the scope of this invention.

The process is carried out under aerobic fermentation conditions. Aerobic fermentation is necessary to provide a source of oxygen for the production of dipicolinic acid from hydrocarbons. Suitable fermentation conditions also include an incubation period or a contact period in which the Penicillium mold, the mineral salts medium, and the hydrocarbon are in intimate contact with one another. In the preferred embodiments of this invention, an incubation period of 13 days was found to be insufficient to produce any dipicolinic acid whereas a 25 day incubation period was sufficient to produce dipicolinic acid in most instances. An incubation period of 48 days was found to be sufficient to permit the production of dipicolinic acid in any culture medium capable of producing dipicolinic acid. For our work we have preferred to use 48 day incubation periods since this length of time permits us to distinguish easily gradations of dipicolinic acid production due to different conditions. For economical production of dipicolinic acid, it may be necessary to provide shorter incubation times or, alternatively, substitution of a continuous fermentation process in place of the batch process described herein.

Another variable fermentation condition is the temperature at which the culture media are allowed to ferment. For our controlled work, it has been found desirable to maintain the fermentation broths at a temperature around 30° C. for the duration of their incubation periods. Constant temperature fermentations in the range of from about 20° C. to about 40° C. can also be used as well as fluctuating temperature fermentations within the same temperature range of about 20° to about 40° C.

Agitation of the fermentation broths can be employed in the process of this invention. Experimentation under fixed conditions of temperature and length of incubation has indicated that rotary agitation is more effective than reciprocating agitation. Either type of agitation may nevertheless be used as well as stationary incubation.

In a preferred method for producing dipicolinic acid, a quantity of the mineral salts medium described above, containing either the corn steep liquor or a synthetically compounded substitute, is placed in a container to which is added a quantity of hydrocarbon. The container is then heated for several minutes at an elevated temperature and pressure to sterilize the contents of the container. The more volatile hydrocarbons are added aseptically to the salts medium after sterilization. Upon cooling, the sterilized mineral salts medium containing the hydrocarbon is inoculated with an aqueous suspension of the Penicillium mold, identified as NRRL 3114 and then incubated at 30° C. Following an adequate incubation period, the solution is filtered to remove mycelium. The mycelium is washed with boiling water to dissolve entrained and crystallized dipicolinic acid. The filtrates are combined, acidified, and extracted with ethyl ether. The ether extracts are then evaporated to yield the dipicolinic acid.

During the incubation, it is often advantageous to determine the rate of dipicolinic acid production, if any. Periodic determinations are helpful in preliminary screening to discover the most suitable hydrocarbons for dipicolinic acid production; these determinations are also helpful in ascertaining the optimum time to stop the fermentation and recover the acid product. A method we have found useful for our analyses is described by Janssen, Lund, and Anderson, Colorimetric Assay for Dipicolinic Acid in Bacterial Spores, Science, 127, 26–27 (1958).

The invention will be more clearly understood from the detailed descriptions of our process set forth in the following examples.

*Example 1*

A culture medium was prepared from the following components:

$KH_2PO_4$ ---- g-- 5
$MgSO_4 \cdot 7H_2O$ ---- g-- 1
$NaNO_3$ ---- g-- 20
$FeSO_4 \cdot 7H_2O$ ---- mg-- 1
KCl ---- mg-- 40
B (as $H_3BO_3$) ---- μg-- 10
Mn (as $MnSO_4 \cdot 5H_2O$) ---- μg-- 10
Zn (as $ZnSO_4 \cdot 7H_2O$) ---- μg-- 70
Mo (as $MoO_3$) ---- μg-- 10
$CaCl_2$ ---- mg-- 15

The above mineral salts are dissolved in sufficient distilled water to make one liter of solution. A quantity of 200 ml. of the above solution was placed in a two liter flask and the flask placed in an autoclave and heated at 121° C. for 15 minutes. To the sterilized mineral salts medium was added 10 ml. of n-hexadecane. This culture medium was then inoculated with 0.2 ml. of an aqueous spore suspension of the Penicillium mold, identified as NRRL 3114, prepared in the following manner. Three Czapeks agar slants were inoculated with mold. After 14 days' growth of the mold had accumulated on the surface of the slants, the surfaces were washed with sterile distilled water. The washings were combined to give about 4 ml. of an aqueous suspension of the Penicillium spores.

The inoculated culture medium was incubated at 30° C. with no agitation for 48 days. After 21 days incubation, 20 ml. of sterile distilled water was added to the culture to replace water lost by evaporation. This procedure was repeated after 32 days. At the end of 48 days, the contents of the flask were heated to boiling and filtered. The mycelium was washed with 25 ml. of boiling distilled water and the wash water added to the filtrate. A quantity of 0.5 ml. of the filtrate was withdrawn, diluted to a volume of 5 ml. and analyzed by the colorimetric method of Janssen et al. The rest of the filtrate was reduced in volume to about 15 or 20 ml. by boiling, acidified with concentrated $H_2SO_4$ to a pH of 1 or 2, and extracted twice with ether. Upon evaporation of the ether, the dipicolinic acid residue was recrystallized from water to yield white, needle-like crystals. The melting point of the crystallized material was 234° C. which compared favorably with the melting point of 235° C. for known dipicolinic acid. The melting point of a mixture of the crystals and dipicolinic acid was 235° C. An infra-red spectrum of the crystalline product is superimposable over a spectrum of dipicolinic acid. Dipicolinic acid production is reported in the table below.

*Example 2*

The procedure described in Example 1 was followed except that 10 ml. of n-tetradecane was used in place of the n-hexadecane. The melting point of the product was 235° C. and the mixed melting point, i.e. the melting point of a mixture of product and known dipicolinic acid, was 235° C. Infra-red spectra of the product and known dipicolinic acid are identical.

*Example 3*

The procedure described in Example 1 was followed except that 10 ml. of n-dodecane was used in place of the n-hexadecane. The melting point of the product was 234° C. and the mixed melting point was 235° C. Infra-red spectra of the product and known dipicolinic acid are identical.

*Example 4*

The procedure described in Example 1 was followed except that 10 ml. of n-decane was used in place of the n-hexadecane. The melting point of the product was 234° C.; the mixed melting point was 235° C. Infra-red spectra of the product and known dipicolinic acid are identical.

*Example 5*

The procedure described in Example 1 was followed except that 10 ml. of n-tetradecene was used in place of the n-hexadecane. The melting point of the product was 234° C.; the mixed melting point was 235° C. Infra-red spectra of the product and known dipicolinic acid are identical.

Example 6

The procedure described in Example 1 was followed except that 10 ml. of kerosene was used in place of the n-hexadecane. The boiling point range of the kerosene was 177° to 272° C. Paraffins-naphthenes-aromatics breakdown for the kerosene was as follows:

| | Percent |
|---|---|
| Paraffins | 54.5 |
| Naphthenes | 38.3 |
| Aromatics | 7.2 |

The melting point of the product was 234° C.; the mixed melting point was 235° C. Infra-red spectra of the product and known dipicolinic acid are identical.

TABLE

| Hydrocarbon | Concentration, Percent v./v. | DPA Produced, mg. |
|---|---|---|
| n-Hexadecane | 5 | 512 |
| n-tetradecane | 5 | 400 |
| n-Dodecane | 5 | 1,628 |
| n-Decane | 5 | 158 |
| n-Tetradecene-1 | 5 | 594 |
| Kerosene | 5 | 486 |

The above data were obtained by analyses of the culture media after incubation according to the method described by Janssen et al.

Although the invention has been described in terms of specified embodiments which are set forth in considerable detail, it should be understood that this was done for illustrative purposes only, and that the invention is not necessarily limited thereto since alternative embodiments and operating techniques will become apparent to those skilled in the art in view of this disclosure. For instance, a continuous fermentation method employing some means of agitation or other form of aeration of the culture is definitely included within the scope of this invention. Accordingly, these and other modifications are contemplated which can be made without departing from the spirit of the described invention.

What is claimed is:

1. A process for preparing dipicolinic acid comprising adding a Penicillium mold, identified as NRRL 3114, to an aqueous mineral salts medium containing a hydrocarbon, and maintaining said mold and said salts medium containing said hydrocarbon under aerobic fermentation conditions for a time sufficient to produce dipicolinic acid.

2. A process according to claim 1 wherein said hydrocarbon is an aliphatic hydrocarbon having from about 10 to about 20 carbon atoms.

3. A process according to claim 1 wherein said hydrocarbon is a straight-chained aliphatic hydrocarbon having from about 10 to about 20 carbon atoms.

4. A process according to claim 1 wherein said hydrocarbon is n-decane.

5. A process according to claim 1 wherein said hydrocarbon is n-dodecane.

6. A process according to claim 1 wherein said hydrocarbon is n-tetradecane.

7. A process according to claim 1 wherein said hydrocarbon is n-tetradecene.

8. A process according to claim 1 wherein said hydrocarbon is n-hexadecane.

9. A process according to claim 1 wherein said hydrocarbon is kerosene.

10. A process according to claim 1 wherein said hydrocarbon is gas oil.

11. A process according to claim 1 wherein said hydrocarbon is fuel oil.

12. A process according to claim 1 wherein said hydrocarbon is crude petroleum.

13. A process according to claim 1 wherein said mold is maintained without further growth in said salts medium.

14. A process for preparing dipicolinic acid comprising adding a Penicillium mold, identified as NRRL 3114, to an aqueous mineral salts medium containing a hydrocarbon, and maintaining said mold and said salts medium containing a hydrocarbon under aerobic fermentation conditions at a temperature from about 20° to about 40° C. for a time sufficient to produce dipicolinic acid.

15. A process according to claim 14 wherein the temperature is about 30° C.

16. A process for preparing dipicolinic acid comprising
    (a) adding a Penicillium mold, identified as NRRL 3114, to an aqueous mineral salts medium containing a hydrocarbon,
    (b) maintaining said mold and said salts medium containing a hydrocarbon under aerobic fermentation conditions at a temperature from about 20° to about 40° C. for a time sufficient to produce dipicolinic acid, and
    (c) extracting said dipicolinic acid from the salts medium.

References Cited

UNITED STATES PATENTS

| 3,219,543 | 11/1965 | Douros et al. | 195—1 |
| 3,222,258 | 12/1965 | Iizuka et al. | 195—29 |

OTHER REFERENCES

Ooyama et al.: Report of the Fermentation Institute of Japan, 19, 75–81 (1961).

Yamada, K. et al.: Agricultural and Biological Chemistry, vol. 27, No. 5, pp. 390–395 (May 1963).

A. LOUIS MONACELL, *Primary Examiner.*

RAYMOND N. JONES, *Examiner.*

L. M. SHAPIRO, *Assistant Examiner.*